Figure 1:
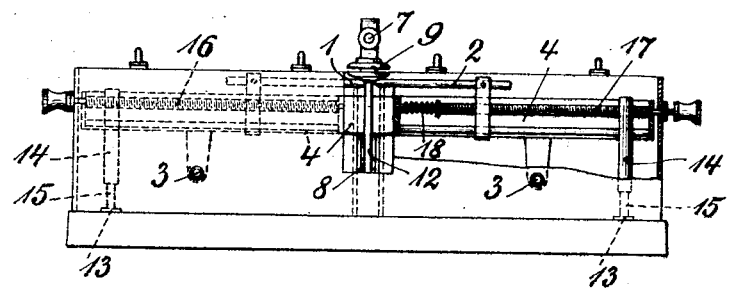

May 13, 1924. 1,494,239
K. HAUSER
APPARATUS FOR ARC WELDING AND HARD SOLDERING SAW BLADES AND THE LIKE
Filed Jan. 2, 1923

Inventor:
Karl Hauser
By: Herbert G. R.
Attorney.

Patented May 13, 1924.

1,494,239

UNITED STATES PATENT OFFICE.

KARL HAUSER, OF STUTTGART, GERMANY.

APPARATUS FOR ARC WELDING AND HARD SOLDERING SAW BLADES AND THE LIKE.

Application filed January 2, 1923. Serial No. 610,379.

*To all whom it may concern:*

Be it known that I, KARL HAUSER, a citizen of the German Republic, and a resident of Stuttgart, Germany, have invented certain new and useful Improvements in Apparatus for Arc Welding and Hard Soldering Saw Blades and the like, of which the following is a specification.

My invention relates to a machine for hard-soldering or welding saw-blades, saw-webs and the like by means of the electric arc produced by any suitable source of current, either direct or alternating, but my invention has more particularly reference to the application and control of the carbons employed in the machine for the welding purpose.

One of the important objects of my invention is to provide a machine of the kind for efficiently and reliably soldering or welding saw-blades and webs of different width. Another object is to provide a machine which, owing to its particular construction and operation, is an advance in the art in economical respects due to its working at a low expenditure of time and work.

With these and other objects in view my invention mainly relates to a machine of the kind and for the purpose stated in which the points of shiftable carbons are moved near, and below, the sawblade so as to heat it sufficiently for the ensuing welding or soldering operation, and in which the carbons are moved off the blade when this is heated sufficiently, the current being at the same time switched off and the blade parts at the joint being subjected to the action of pressing cheeks which press said parts firmly one upon the other so as to effect the welding or soldering.

The carbons are arranged in a shiftable member, such as a carriage, slide, or the like, and this member is connected with a lever which is moved when the welding is to take place, the connection of said member and said lever being such that the former is shifted either crosswise with respect to the blade or vertically with respect thereto, whereby the blade is heated uniformly throughout its entire breadth.

The saw-blade having been heated sufficiently, is subjected to the action of the pressing-cheeks mentioned which may be moved by a lever or an equivalent member; simultaneously with moving the pressing-cheeks towards each other, the position of the carriage or slide is changed and the circuit is broken so that the supply of the electric current ceases. The position of said carriage or slide is altered automatically, viz, by means of springs, which are released in proper time; they are provided with a suitably arranged guide-plate and press the carriage or slide against a guide-roll carried by the lever by which the pressing cheeks are actuated.

The current is supplied by means of two contact-rails on which a member connected with the carbons can slide.

Besides the before-mentioned characteristic features of the invention, another consists in the carbon support proper. With the known apparatus of the kind in question, or for the purpose in view in general, the drawback has been experienced that when the carbons were approached, and made to contact with, each other in order to form the arc a considerable amount of current was lost, and it occurred that the conductors were short-circuited. This is obviated, according to the invention by vertical movability of one of the carbons, together with its actuating spindle, and by providing a spring for this purpose, the arrangement being such that the two carbons are always kept at a certain distance from each other. They can be approached toward each other by a pressure exerted on the actuation knob of the movable spindle, but move away from one another when that pressure ceases. Contact is, thus, produced only for a second, and the loss in current is very slight.

An embodiment of my invention is illustrated, by way of example, in the accompanying drawings, in which:—

Figure 2:
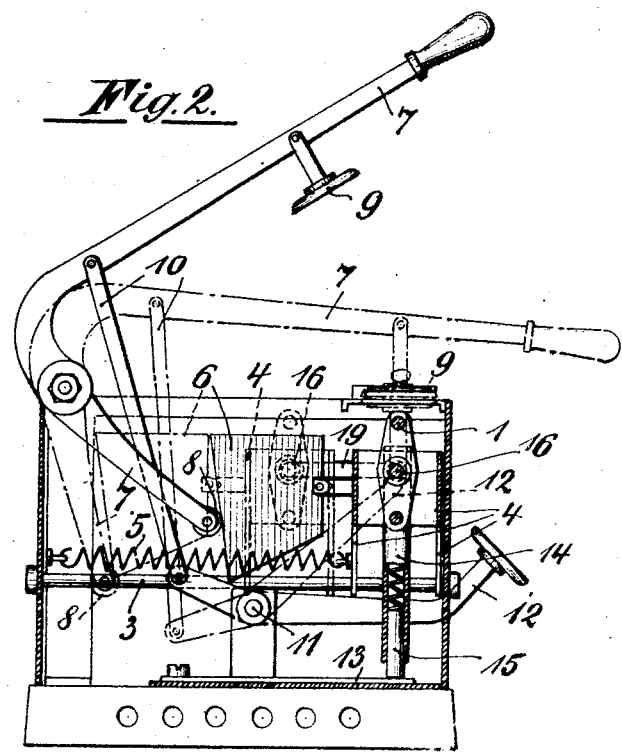

Figure 1 is a front view showing a modification of the machine with parts of its front wall broken off, and Figure 2 is a cross-sectional view thereof on a larger scale.

Before proceeding to specifically describe the machine which I have selected as best embodying my invention, I desire to have it understood that the machine does not represent the only embodiments of which the invention is capable, that a wide range of equivalents may be employed for the single parts which I have illustrated and will hereinafter describe, and that the phraseology which I have adopted is for the purpose of description and not of limitation except where the sense absolutely requires it.

In the embodiment illustrated in Figures 1 and 2 a single pair of carbons only is employed. In this modification the carbons are duly supported by suitable means in a carriage 4 adapted to slide on guiding rods 3 and subjected to the action of two springs 5 acting to uninterruptedly hold a wedge-shaped plate 6 rigidly connected with the carriage, in engagement with a guiding roller 8 journaled in suitable bearings of the lower arm of the upper pressing lever 7. Pivotally connected to the upper arm of the latter are a pressing jaw or disk 9 and a rod 10, the lower end of which is pivotally attached to the shorter arm of the lower pressing lever 12, the fulcrum of which is shown at 11.

In this modification current is supplied by means of the contact rails 13 and conductors adapted to slide thereon. Said conductors comprise carbon rods 15 with yieldingly supported conducting sleeves 14 engaging the horizontal screw-spindles 16 and 17 carrying the two carbons 1 and 2, respectively. The carbon 2 or its carrying spindle 17 is arranged so as to allow of being displaced in axial direction against the pressure of a spring 18 coiled about the inward end of said spindle, whereby the carbon 2 can be brought in contact with the carbon 1 by such axial displacement, but, as soon as released from the displacing energy, it will return, under the action of the spring, to its outer or contactless position, as will be clearly understood from an inspection of Figure 1. When the position of the carriage is changed the screw-spindles 16 and 17 find a free passage to move in recesses 19 of the side walls of the casing, as will be seen in Figure 2.

The operation is as follows: The saw-blade or web is properly placed on the machine so that the portion to be soldered or welded will overlie the contacting ends of the two carbons 1 and 2. By properly swinging the lever 7 the carriage 4 can be caused, through the agency of the roller 8 and the plate 6, to move across, so that the electric arc produced by the two carbons will accordingly move across the blade, thus ensuring a uniform heating of the portion to be soldered or welded.

When the heating operation is completed, the two pressing disks 9 are forced together, that is to say, they are moved, by means of the lever 7, from the position shown in Figure 5 in full lines to the position shown in Figure 5 in broken lines, in order to grip the heated part of the work. Owing to the described positively operating connection between the two levers 7 and 12 and the carriage 4 the latter is moved out of the way by the aforesaid displacement of the lever 7 so that the two pressing disks 9 find their way free to approach each other.

The carriage carrying the electrodes or carbons may be adapted to move on a horizontal track laterally from and towards the work, or to move in horizontal direction below the work as illustrated in the figures. Moreover the carriage may be adapted to be moved, however, in vertical direction through the agency of an operating lever. In this case the carbons also will be connected with the source of electric supply in a manner, that they are supplied with current only when required for heating the work, and that the current is cut off automatically, when the carriage is operated to be removed from the saw-blade or web in vertical direction.

From the above description it will be apparent that I have provided an apparatus or machine that can be quickly adapted to the work, and one in which the work to be done will be carried out quickly and in an efficient manner with a least expenditure of current and time. It will also be apparent that numerous changes and alterations may be made in the detail arrangement of parts and I do not, therefore, wish to be limited to the exact details shown and described.

What I claim is:—

1. An apparatus for welding and hard-soldering saw-blades and the like, comprising, in combination, a pair of carbons, means to carry them, and means to shift them so as to cause their arc-forming and arc-maintaining ends to be located below the blade joint in the proximity thereof while the welding or soldering proceeds; means to support the blade appropriately; means to switch off the current automatically when the carbon points are withdrawn from the place of support of the saw blade, and means for subjecting the blade to pressure after the heating, substantially as set forth.

2. An apparatus for welding and hard-soldering saw-blades and the like, comprising a movable carriage carrying one pair of carbons, a work supporting table located in a horizontal plane above the said carriage, a hand-operated lever adapted to engage with the said carriage to move the latter, during the heating operation, in a direction rectangular to the length of the work, substantially as described.

3. An apparatus for welding and hard-soldering saw-blades and the like, comprising a movable carriage carrying a single pair of carbons, a work supporting table located in a horizontal plane above the said carriage, a hand-operated lever, a wedge-shaped plate integral with the carriage, and a roller journaled in the said lever so as to engage with the said plate, substantially as set forth.

4. An apparatus for welding and hard-soldering saw-blades and the like, comprising a movable carriage carrying a single pair of carbons, a work supporting table located in a horizontal plane above the said carriage, a hand-operated lever adapted to engage with the said carriage to move the latter, during the heating operation, in a direction at right angles to the length of the work, conducting rails, yielding conducting members adapted to slide thereon, and screw-spindles carrying the carbons and engaged by said members, substantially as set forth.

5. An apparatus for welding and hard-soldering saw-blades and the like, comprising a movable carriage carrying a single pair of carbons, a work supporting table located in a horizontal plane above said carriage, a hand-operated lever adapted to engage with the latter to move the same, during the heating operation, vertically to the length of the work, conducting rails, yielding conducting members adapted to slide thereon, and screw-spindles carrying the carbons and engaging in said members, the one of the carbon carrying spindles being mounted so as to be axially displaceable against the resistance of a spring, substantially as set forth.

6. An apparatus for welding and hard-soldering saw-blades and the like, comprising a movable carriage carrying a single pair of carbons, a work supporting table located in a horizontal plane above said carriage, a hand-operated lever, a wedge-shaped plate integral with the carriage, a roller mounted in said lever so as to engage with the said plate, two screw-spindles carrying the carbons, the one displaceable the other one not displaceable in axial regards, and a spring coiled about the displaceable spindle to yieldingly hold the carbon a distance apart from the other carbon, substantially as described.

In testimony wherof I affix my signature in presence of two witnesses.

KARL HAUSER. [L. S.]

Witnesses:
HERMAN HUTH, [L. S.]
RUDOLPH STORZBACH. [L. S.]